Figure 8:
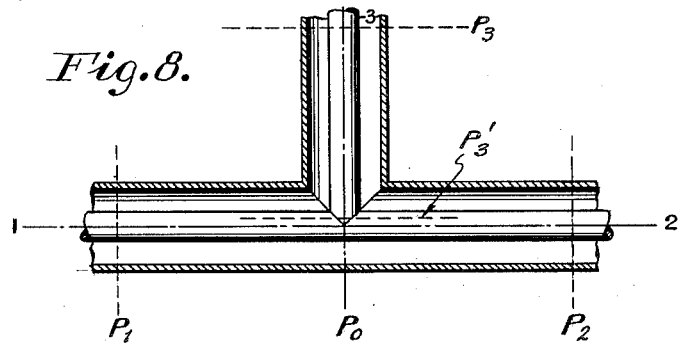

Sept. 15, 1953 R. B. MUCHMORE 2,652,544
COAXIAL LINE CONNECTOR
Filed Dec. 10, 1948 3 Sheets-Sheet 1
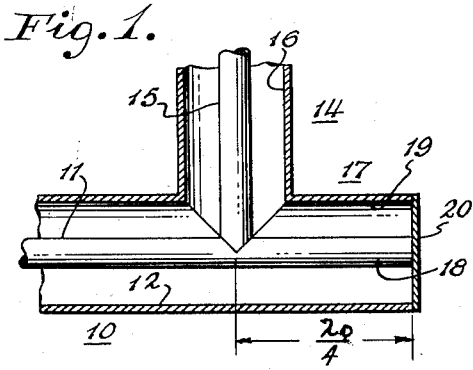
Fig. 1.
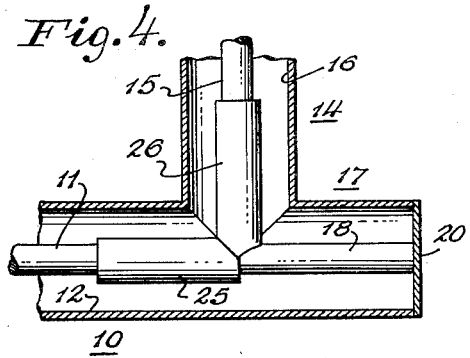
Fig. 4.
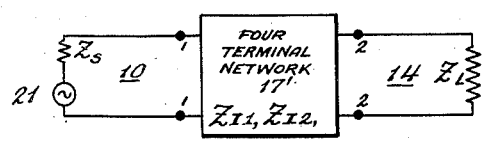
Fig. 2.
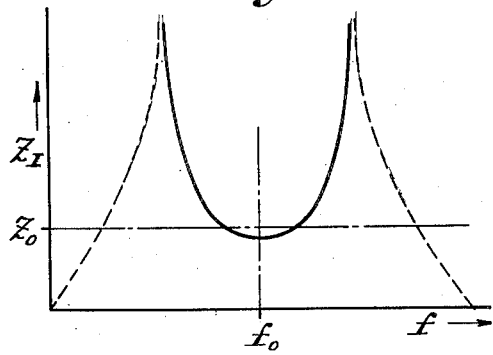
Fig. 5.
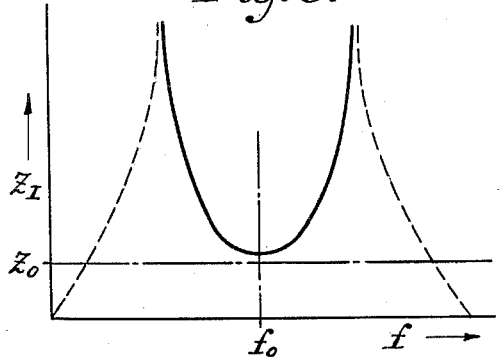
Fig. 3.
Fig. 7.
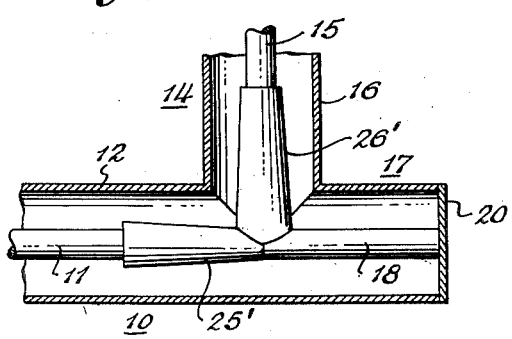
Fig. 6.
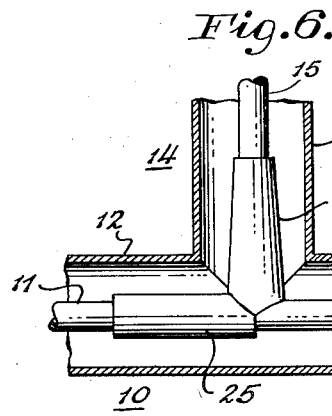
INVENTOR.
ROBERT B. MUCHMORE
BY
Paul B. Hunter
ATTORNEY Sept. 15, 1953     R. B. MUCHMORE     2,652,544
COAXIAL LINE CONNECTOR Filed Dec. 10, 1948     3 Sheets-Sheet 2

INVENTOR.
ROBERT B. MUCHMORE
BY
ATTORNEY

Sept. 15, 1953 R. B. MUCHMORE 2,652,544
COAXIAL LINE CONNECTOR
Filed Dec. 10, 1948 3 Sheets-Sheet 3
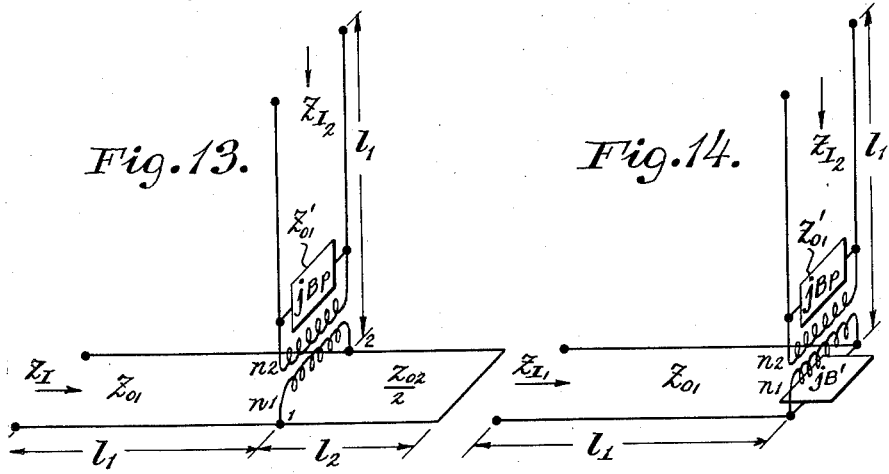
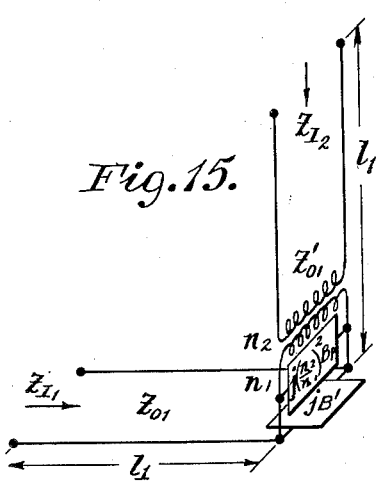
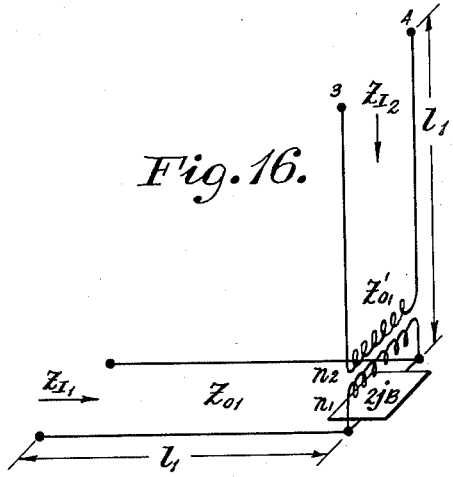
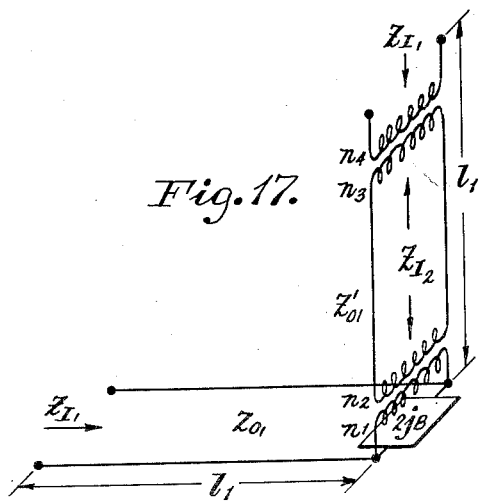
INVENTOR.
ROBERT B. MUCHMORE
BY
ATTORNEY Patented Sept. 15, 1953

2,652,544

UNITED STATES PATENT OFFICE 2,652,544

COAXIAL LINE CONNECTOR

Robert B. Muchmore, Hawthorne, Calif., assignor to The Sperry Corporation, a corporation of Delaware Application December 10, 1948, Serial No. 64,475

2 Claims. (Cl. 333—95)

This invention relates to coaxial transmission line systems and in particular to improved types of right angle coaxial line corners used in such systems.

In the past, right angle coaxial line corners were designed to operate at a particular frequency, and were not capable of efficiently transmitting electromagnetic energy at frequencies slightly removed from their design frequency. Such right angle corners or connectors consisted, in general, of two sections of coaxial line oriented at a right angle to each other with the center conductors being supported by a quarter-wavelength stub support. The stub support was usually a linear extension of one of the two line sections, its length being made equal to a quarter-wavelength, measured at the design frequency. Such a right angle corner would set up little or no reflections if operated at the design frequency. However, if the operating frequency deviated somewhat from the design frequency, reflections would be set up within the coaxial transmission line, thereby creating standing waves. As is well known, the efficiency of a transmission line decreases as the magnitude of the standing waves increases. Therefore, the conventional right angle corner could operate efficiently over but a limited frequency range.

The present invention provides a right angle connector which operates over a relatively broad range of frequencies while maintaining a low standing wave ratio. The design of such improved right angle connectors has resulted from an analysis of the operation of such connectors on the filter theory basis. In such an analysis the stub section which supports the center conductors of the two line sections at their junction may be considered as an impedance element shunting a section of main transmission line, and the stub and line taken together may be considered as a four terminal network having ends 1 and 2. If this network is inserted in tandem with the main transmission line in such a way that operation is on an image impedance basis, then the properties of the network may be described in terms of the image impedances $Z_{I_1}$ and $Z_{I_2}$ of ends 1 and 2 of the network itself. By operation on an image impedance basis is meant that for any given operating frequency there exists a pair of impedances $Z_{I_1}$ and $Z_{I_2}$ such that if a generator of impedance $Z_{I_1}$ is connected between the first pair of terminals of the network, the load impedances $Z_{I_2}$ is connected between the second pair of terminals, the impedance looking both directions at the first pair of input terminals will be equal and the same will be true of the impedance viewed in both directions at the second pair of terminals.

If the image impedance of one end of the network is equal to the characteristic impedance of the line to which it is joined, and if the image impedance of the other end of the network is equal to the characteristic impedance of the line to which it is joined, it follows that no reflections will occur in transmitting energy through the network and no resulting standing waves will be created in the transmission line by the network. This assumes, of course, a matched condition at the load end of the line section joining the load and the network. Such reflectionless transmission is, of course, to be desired inasmuch as the efficiency of the system is maximum. However, if the image impedance of the network changes with the frequency and the characteristic impedance of the lines to which the network is connected remain constant, reflections will be set up in the system as the operating frequency is changed, lowering the efficiency of the system. The magnitude of the reflections is determined by the impedance mismatch between the line and the changed image impedance of the four terminal network under consideration. For this reason it is desirable that the image impedance measured at each end of the network remain relatively constant over a wide band of frequencies for efficient transmission of energy in this operating range.

Since in most transmission line systems it is desirable to use but a single size transmission line having a constant characteristic impedance, any four terminal network which is introduced in tandem with such a transmission line should have the same image impedance when viewed from either end. Otherwise while the line may match one end of the network, it is obvious that the remaining end must be mismatched. For that reason it is desirable to incorporate some sort of impedance transformer in the network so that the resultant system is electrically symmetrical. In such symmetrical networks the image impedance $Z_{I_1}$ measured at one end equals the image impedance $Z_{I_2}$ measured at the opposite end and the network may be conveniently described by a single image impedance $Z_I$.

It is therefore an object of the present invention to provide a coaxial transmisison line connector which is capable of operating over a relatively wide band of frequencies while maintaining a low standing wave ratio.

It is a further object of the present invention to provide a coaxial transmission line connector which exhibits electrical symmetry when viewed from either end.

A still further object of the present invention is to provide a coaxial transmission line connector having an image impedance which remains substantially constant over a broad band of frequencies.

A still further object of the present invention is to provide a coaxial transmission line connector having the same image impedance when viewed from either end.

Briefly, the present invention provides for the introduction of quarter-wave transformers connected in series with each of the center conductors of the right angle connector at their junction. Such quarter-wave transformers aid in making the image impedance of the connector have the same general magnitude as the characteristic impedance of the transmission line. In addition a slight taper is provided to one of the quarter-wave transformers so that an impedance transformation takes place making the resultant right angle connector exhibit the desired property of electrical symmetry.

The above-mentioned features and objects as well as others will be better understood by references to the following description of the construction and operation of such an improved coaxial transmission line connector when taken in connection with the drawings in which, Fig. 1 is a cross-sectional view of a conventional right angle connector utilizing a quarter-wave stub support, Fig. 2 is a schematic representation of such a right angle connector as shown in Fig. 1, connected in series with a transmission line having a load and generator connected thereto, Fig. 3 is an image impedance vs. frequency plot of the four terminal network shown in Fig. 2, Fig. 4 is a cross-sectional view of an improved form of right angle connector, according to the present invention, Fig. 5 is an image impedance vs. frequency plot of the improved right angle connection shown in Fig. 4, Figures 6 and 7 are cross-sectional views of further improved right angle connectors and according to the invention Figures 8–17 are schematic electrical diagrams useful in explaining the development of the present invention.

Referring now in particular to Fig. 1 which is a cross-sectional view of a conventional right angle connector, coaxial line section 10, having an inner conductor 11, and outer conductor 12, is rigidly connected to coaxial line section 14, having an inner conductor 15 and outer conductor 16. The coaxial relation of inner conductors 11 and 15 with their respective outer conductors 12 and 16 is maintained by stub section 17. This stub section comprises a short section of coaxial line having inner conductor 18 and outer conductor 19 conductively connected through shorting disc 20. Inner conductor 18 joins the junction of inner conductors 11 and 15, and may be considered as a linear extension of inner conductor 11. In like manner outer conductor 19 of stub section 17 may be considered as a linear extension of outer conductor 12. The length of stub section 17 as shown in the drawings is maintained at very nearly a quarter of a wavelength of the design operating wavelength designated by $\lambda_0$. This is the wavelength at which the connector is designed to efficiently transmit electromagnetic energy.

In order to analyze the operation of such a right angle connector as shown in Fig. 1 it has been found desirable to utilize filter theory. In such a case stub section 17 may be considered as an impedance element shunting transmission lines 10 and 14 which are connected in series. This is shown schematically in Fig. 2 in which four terminal network 17' is connected in tandem with transmission lines 10 and 14. Transmission line 14 is terminated in a matched load impedance $Z_L$, and transmission line 10 is terminated by generator 21 having an internal impedance $Z_S$. The operation of four terminal network 17' may be analyzed by reference to its image impedance $Z_{I_1}$ and $Z_{I_2}$ measured at terminals 1—1 and 2—2 respectively. Fig. 3 is a plot of image impedance vs. frequency of four terminal network 17' as shown in Fig. 2. In an unsymmetrical network the image impedance at one end of the four terminal network differs from that measured in the opposite end. However, the general shape of the image impedance plot remains approximately the same, so that only one plot is shown. It will be seen from Fig. 3 that the image impedance has a minimum value at the design frequency $f_0$ and increases in magnitude symmetrically on either side of this design frequency $f_0$. The dashed lines indicate those frequencies at which the image impedance has an imaginary value. Physically, this indicates the stop-bands of the filter in question. The impedance $Z_0$, shown as a constant with changing frequency is drawn to represent the characteristic impedance of the transmission line to which the filter is connected. Since the difference between the image impedance of the filter and the characteristic impedance of the line to which it is connected is minimum at the design frequency, it is seen that at this frequency $f_0$, the minimum mismatch occurs.

From an analysis of the generalized curve of Fig. 3 it can be seen that in order to have a broad band of operating frequencies in which the standing wave ratio remains low it is necessary that the image impedance plot have a broad minimum, that is, the image impedance remains relatively constant over a broad band of frequencies. Furthermore, this minimum image impedance should approach as nearly as possible the magnitude of the characteristic impedance of the transmission line in which the filter is to be interposed so that the impedance mismatch between the filter and transmission line is minimized. From this it is seen that by broadening the image impedance curve of the network, the range over which the network can operate without exceeding a fixed voltage standing wave ratio is increased. Furthermore, if the minimum value of the image impedance of the filter section is reduced until it equals or is less than the characteristic impedance of the transmission line, the standing wave ratio will be minimized over a broad range of operating frequencies.

Fig. 4 illustrates a modified form of coaxial right angle connector constructed according to this invention in which the resultant image impedance plot is broadened so that the frequency range over which the connector is operable with efficiency is considerably increased. In addition, the minimum value of image impedance of the filter section has been reduced in value so that it is less than the characteristic impedance of the transmission line into which it is inserted in tandem. As in Fig. 1 the connector embodiment shown in Fig. 4 utilizes a quarter-wave stub support 17 connected to the junction of coaxial line sections 10 and 14. Inner conductor 18 of stub section 17 is supported by shorting disc 20. The free end of inner conductor 18 joins the junction of inner conductors 11 and 15, and maintains them in their coaxial relationship with outer conductors 12 and 16 respectively. The broadbanding of this device is acheived by the addition of sleeves or transformers 25 and 26. These sleeves are placed over inner conductors 11 and 15 and extend from the junction of these two inner conductors to a point approximately a quarter-wavelength displaced from the junction. The sleeves serve to increase the diameter of the inner conductors and thus decrease the characteristic impedance of transmission lines 10 and 14 in the region from the junction thereof to a quarter-wavelength therefrom along each respective line. The sleeves 25 and 26, if desired, may be made integral with inner conductors 11 and 15.

The effect of the addition of such quarter-wave transformers can best be understood by reference of Fig. 5 which is a plot of the image impedance vs. frequency of such a modified right angle connector. As in the case of the connector shown in Fig. 1, the image impedance when viewed from one end of the connector may differ from that viewed at the other end, but the general shape of the plot remains the same. Therefore, Fig. 5 is representative of the image impedance of either end of the device illustrated in Fig. 4. It will be seen from Fig. 5 that the plot of the image impedance has a relatively broad minimum. Furthermore, it will be noted that the addition of the sleeves 25 and 26 has reduced the minimum value of image impedance measured at $f_0$ to a magnitude less than the characteristic impedance $Z_0$ of the coaxial transmission line into which the connector is inserted in tandem. From this curve it is readily seen that because of the slight broadening of the image impedance plot and because of the reduction of the minimum value of image impedance to a magnitude less than the characteristic impedance $Z_0$, a broad range of operating frequencies exist in which the mismatch between the connector and the coaxial line has been kept at an extremely low value. Therefore, the device will operate over a relatively broad range of frequencies while maintaining a low value of standing wave ratio.

Since such right angle connectors are to be utilized in systems employing but a single size coaxial line it can be seen that it is desirable that the right angle connector be electrically symmetrical. That is, the image impedance plot should be the same when drawn from measurements made at either end. If the connector is so constructed the mismatch created by it is the same regardless of the end of the connector at which the mismatch is measured.

In order to achieve such a broadband symmetrical connector the embodiment shown in Fig. 6 is utilized. As in the connector shown in Fig. 4 a quarter wave stub support 17 is joined to the junction of line sections 10 and 14. Inner conductor 18 of stub section 17 is supported by a shorting disc 20. The free end of inner conductor 18 joins the junction of inner conductors 11 and 15, and maintains them in coaxial relationship with outer conductors 12 and 16 respectively. As in the embodiment shown in Fig. 4 this embodiment utilizes a quarter-wave sleeve 25 placed over inner conductor 11. However, sleeve 26' utilized in this embodiment is tapered along its length, its diameter decreasing at increasing distances from the junction. The sleeves 25 and 26' extend from the junction to a point a quarter-wavelength displaced therefrom. As in the previous embodiment the sleeves serve to increase the diameter of the inner conductors and thus descrease the characteristic impedance of transmission lines 10 and 14 in the region from the junction to a quarter-wavelength therefrom along the respective lines.

By providing the taper on sleeve 26' the diameter of the inner conductor decreases at increasing distance from the junction. This decrease in inner conductor diameter provides an additional impedance transformation. By proper selection of dimensions as will later be described the resulting connector is electrically symmetrical. That is, not only is the plot of the image impedance broadened at its minimum but the plot is the same regardless at which end of the connector the measurements are made. This feature permits the connector to be utilized in systems employing but a single size coaxial line. When so employed the connector provides a right angle corner connector which permits the transmission of electrical energy over a relatively broadband of frequencies while maintaining a low voltage standing wave ratio.

Fig. 7 shows a modified version of connector shown in Fig. 6. In this modified version the quarter-wave sleeve 25' is provided with a taper in a similar manner to tapered sleeve 26'. However, the sense of the taper is reversed, that is, the diameter of the inner conductor increases with increasing distance from the junction of inner conductors 11 and 15. The purpose of this second taper is to remove the slight discontinuity which appears in Fig. 6 at the point where inner conductor 18 meets sleeve 25 at the junction. By removing this discontinuity the resulting connector not only has the properties of electrical symmetry as does the connector shown in Fig. 6, but in addition, it has been found that the image impedance plot has an even broader minimum than that of the embodiment shown in Fig. 6.

Figure 9:
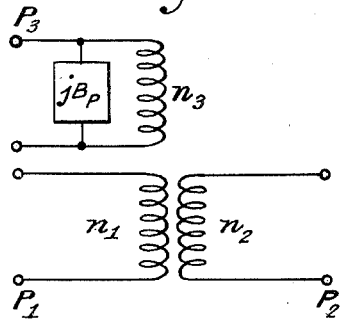

In order to more clearly understand the proper design of such a tapered right angle connector a consideration of the filter theory used in developing this device is in order. Figs. 8-17, which are merely schematic electrical diagrams, will be found useful in understanding such an explanation. Fig. 8 shows a conventional coaxial line junction in which the characteristic planes $P_1$, $P_2$, and $P_3$ are oriented such that a short in any one leg of the tee at the point of the plane produces total reflection for energy fed in from any other leg. Also under such conditions of total reflection, the voltage minimum in the exciting leg will be at the characteristic point of that leg. A consideration of the admittance matrices of the network having this property will show that an equivalent circuit is a multi-winding perfect transformer with one or all of the windings shunted by an impedance which will be purely reactive if there are no losses in the junction. That is, the portions of the junction which are inside the planes $P_1$, $P_2$, and $P_3$ may be replaced by the above stated perfect transformer which couples each leg to every other leg. Fig. 9 is the equivalent circuit of such a transformer in which $n_1$, $n_2$, and $n_3$ represent the number of turns and $B_p$ represents the effects of the attenuated higher modes set up by the transmission of energy past the junction point. We may say that $n_1$ equals $n_3$ by symmetry.

Figure 10:
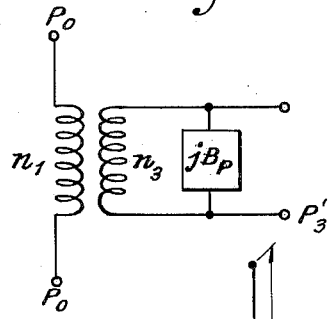

Experiments with a type of coaxial line designated as RG-76-U has shown that the distances of $P_1$ and $P_2$ from the junction very nearly equal $\lambda/2$ for all wavelengths greater than 5 centimeters. Thus $P_1$ and $P_2$ may each be moved in toward the junction a distance equal to one-half wavelength to $P_0$ without affecting the equivalent circuit. $P_3$ may also be moved down one-half wavelength to $P'_3$ shown in Fig. 8. These changes make possible the simpler equivalent circuits as shown in Fig. 10.

At this point it is well to introduce the three conventional parameters that characterize a transmission network on an impedance basis. These three parameters are: $\theta$, $Z_{I_1}$, and $Z_{I_2}$, which are defined for the networks used here by the following Equations 1, 2, and 3:

$$\cosh \theta = \sqrt{\cos^2 bl_1 + Z_{01}B \sin bl_1 \cos bl_1} \quad (1)$$

$$Z_{I_1} = Z_{0_1} \sqrt{\frac{1 - Z_{01}B \tan bl_1}{1 + Z_{01}B \cot bl_1}} \quad (2)$$

$$Z_{I_2} = \frac{Z_{01}}{\sqrt{1 + 2BZ_{01} \cot 2bl_1 - B^2 Z_{01}^2}} \quad (3)$$

In filters employing resonant shunt elements B may be written $$B = -\frac{1}{Z_{02}} \cot bl_2 \quad (4)$$

where $l_2$ = length of stub. In these equations $$b = \frac{2\pi}{\lambda}.$$

Referring to the circuits of Figs. 3 and 10 we can now consider line 3 in shunt with line 1—2 of Fig. 9 at plane $P_0$ with the change in impedance level, and in addition susceptance $B_p$ will be present as discussed above. For convenience in analysis $B_p$ is neglected, but its effects can be taken into account by a small change in the length of line 2.

If Equation 4 is now taken to represent the susceptance looking toward line 3 from the terminal $P_0$ with the distance $l_2$ measured from $P'_3$ as in Fig. 8, Equations 1, 2 and 3 then become Equations 5, 6 and 7:

$$\cosh \theta = \sqrt{\cos^2 bl_1 + \frac{Z_{01}}{Z_{02}} \sin bl_1 \cos bl_1 \cot bl_2} \quad (5)$$

$$Z_{I_1} = Z_0 \sqrt{\frac{1 + \frac{Z_{01}}{Z_{02}} \tan bl_1 \cot bl_2}{1 - \frac{Z_{01}}{Z_{02}} \cot bl_1 \cot bl_2}} \quad (6)$$

$$Z_{I_2} = \frac{Z_{01}}{\sqrt{1 - \frac{Z_{01}^2}{Z_{02}^2} \cot^2 bl_2 - 2\frac{Z_{01}}{Z_{02}} \cot 2bl_1 \cot bl_2}} \quad (7)$$

Equations 5, 6 and 7 enable one to properly design either a conventional "tee-stub" or a right angle corner connector.

If the short is located properly in one of the symmetrical arms and the stub is left open a right angle corner is formed. The following equivalent circuits will completely describe the evolution of the tapered right angle from the conventional "tee-stub."

Figure 11:
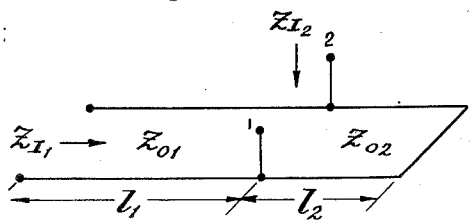
Figure 12:
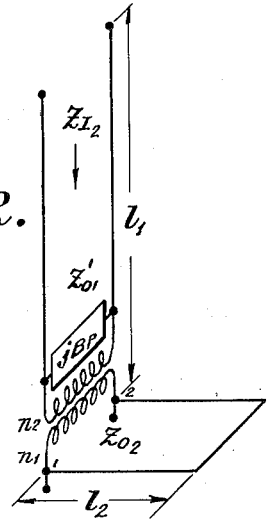

Fig. 11 is an equivalent circuit showing a conventional half section filter. The image impedances are designated as $Z_{I_1}$ and $Z_{I_2}$. In order to make a full section another such half section is added. This other half section is shown schematically in Fig. 12. As can be seen length $l_2$ of this half section is oriented at right angles to length $l_1$ and is considered to contain the transformer and shunt susceptance $B_p$ as described above. The two half sections may be joined together as is shown in Fig. 13. It is to be noted that since the two half sections are placed in cascade the actual stub used will now have a characteristic impedance $$\frac{Z_{02}}{2}$$

as indicated in Fig. 13. The two half sections may be joined together since it was assumed that the image impedance of each of the sections was the same.

Fig. 14 is apparent from Fig. 13 where B' represents the lumped section $l_2$. If we now transform $B_p$ from the primary of $l_1$ to the secondary Fig. 15 is arrived at, and Fig. 16 merely combines the transformed $B_p$ and B', which are evidently in parallel. The physical representation of Fig. 16 is shown in Fig. 2. In this illustration and from the foregoing analysis $Z_{I_1}$ does not equal $Z_{I_2}$. However, if another transformer is added to terminals 3 and 4 of Fig. 16 with a turns ratio of $n_3:n_4$ such that $$\frac{n_1}{n_2} = \frac{n_3}{n_4}$$

the filter then becomes symmetrical. Fig. 17 is an equivalent circuit of such a symmetrical right angle corner, and the physical representation of such a symmetrical filter is that shown in Fig. 6 with the taper providing the transformer action $n_4/n_3$. From this it is seen that the tapered section provides an additional transformation such as to make the resulting device electrically symmetrical.

It can be seen that there is a second order effect introduced by the abrupt change in physical dimensions at the junction joint. This effect can be minimized by making $l_1$ of Fig. 17 slightly tapered as is done in Fig. 7.

One embodiment of such a right angle corner was constructed in accordance with the above theory, utilizing coaxial transmission line whose inner conductor had an outer diameter of .250 inch and whose outer conductor had an inner diameter of .561 inch. Taper 25' was .590 inch in length and its diameter tapered from .294 inch to .300 inch. Taper 26' was also .590 inch in length and tapered from a diameter of .294 inch to .300 inch in diameter. The length of shorted stub in this embodiment was .729 inch. This right angle corner was able to transmit energy in the wavelength region from 5.4 to 7.4 centimeters without exceeding a voltage standing wave ratio of 1.05.

Therefore, by the present invention a right angle coaxial transmission line connector is provided which operates over a relatively broadband of frequencies while maintaining a low standing wave ratio. This connector exhibits electrical symmetry when measured at either end and provides an efficient right angle corner for a coaxial transmission line system.

What is claimed is:

1. A coaxial transmission line connector comprising a first section of coaxial line having an inner and outer conductor, a second section of coaxial line having an inner and outer conductor joined respectively to said inner and outer conductor of said first section, a section of short-circuited coaxial line, the free end of the inner conductor of said short-circuited line section being connected to the junction of the inner conductors of said first and second line sections, and the free end of the outer conductor of said short-circuited line section being connected to the junction of the outer conductors of said first and second line section, a first metallic sleeve positioned over the junction end of the inner conductor of said first line section and a second metallic sleeve positioned over the junction end of the inner conductor of said second line section, one of said sleeves having a decreasing outer diameter at increasing distance from said junction, and the other of said sleeves having an increasing outer diameter at increasing distance from said junction.

2. A coaxial transmission line junction comprising a first section of coaxial line having an inner and outer conductor, said first section of coaxial line being terminated in a short circuit at one end thereof, a second section of coaxial line having an inner and outer conductor connected respectively to the inner and outer conductor of said first section in substantially perpendicular relationship, the inner conductors joining at a point along the first section an electrical distance from the short circuit termination of a quarter wavelength at the design frequency, a first sleeve positioned over the end of the inner conductor of said second section adjacent the junction with said first section, said first sleeve being substantially a quarter wavelength long at the design frequency and having a decreasing outer diameter with increasing distance from the junction of the two sections, and a second sleeve positioned over the inner conductor of said first section adjacent the junction with said second section, said second sleeve extending along the inner conductor of said first section in a direction away from the short circuit termination a distance of a quarter wavelength at the design frequency from the junction of the two sections.

ROBERT B. MUCHMORE.

References Cited in the file of this patent

UNITED STATES PATENTS

| Number | Name | Date |
|---|---|---|
| 2,446,982 | Pound | Aug. 10, 1948 |
| 2,530,064 | Jones | Nov. 14, 1950 |

FOREIGN PATENTS

| Number | Country | Date |
|---|---|---|
| 586,619 | Great Britain | Mar. 25, 1947 |

OTHER REFERENCES

"Microwave Transmission Design Data," publication No. 23–80, by Sperry Gyroscope Company, Div. of the Sperry Corp., Great Neck, Long Island. Copy in Patent Office Library on Jan. 23, 1946.

"Microwave Transmission Circuits," by Ragan, M. I. T. Radiation Lab. Series No. 9, copyright May 21, 1948, pub. by McGraw-Hill.